United States Patent [19]

Perry

[11] Patent Number: 5,431,475
[45] Date of Patent: Jul. 11, 1995

[54] BODY FOR END DUMP TRAILER

[75] Inventor: John Perry, Reston, Va.

[73] Assignee: Travis Body & Trailer, Inc., Houston, Tex.

[21] Appl. No.: 145,231

[22] Filed: Nov. 3, 1993

[51] Int. Cl.⁶ .................... B60P 1/00; B62D 25/20
[52] U.S. Cl. ........................... 296/181; 296/184; 296/204; 296/209; 296/29; 298/1 R
[58] Field of Search ............... 296/184, 181, 183, 29, 296/204, 209; 298/1 R; 280/797

[56] References Cited

U.S. PATENT DOCUMENTS

| | | | |
|---|---|---|---|
| 2,275,349 | 3/1942 | Collender | 296/184 |
| 2,380,861 | 7/1945 | Meyer et al. | 296/184 |
| 2,405,260 | 8/1946 | Ledwinka et al. | 280/797 X |
| 3,088,750 | 5/1963 | Schilberg | 280/797 X |
| 3,105,701 | 10/1963 | Schilberg | 280/797 X |
| 3,163,463 | 12/1964 | Femrite | 296/184 X |
| 3,462,187 | 8/1969 | Hassler | 296/184 |
| 3,499,678 | 3/1970 | Richler . | |
| 3,804,464 | 4/1974 | Gust | 296/184 X |
| 3,897,972 | 8/1975 | Logue . | |
| 3,909,059 | 9/1975 | Benninger et al. . | |
| 4,049,285 | 9/1977 | Chieger . | |
| 4,273,381 | 6/1981 | Bibeau et al. . | |
| 4,616,879 | 10/1986 | Boober | 296/184 X |
| 4,787,669 | 11/1988 | Wante | 296/182 |

FOREIGN PATENT DOCUMENTS

| | | | |
|---|---|---|---|
| 0043228 | 6/1981 | European Pat. Off. . | |
| 309358 | 3/1989 | European Pat. Off. | 296/181 |
| 3605988 | 8/1987 | Germany . | |
| 3611639 | 8/1987 | Germany . | |
| 3816879 | 12/1988 | Germany . | |
| 624240 | 5/1949 | United Kingdom | 296/29 |
| 1431764 | 4/1976 | United Kingdom | 296/184 |
| WO86/05754 | 10/1986 | WIPO . | |

Primary Examiner—Dennis H. Pedder
Attorney, Agent, or Firm—Howard L. Rose

[57] ABSTRACT

A semi-end dump trailer body employs hollow rectangular rubrail along each side of the trailer body with crossmembers of U-shaped configuration with outwardly flared sidewalls welded to the inner vertical wall of the rubrails and to inward, relatively short horizontal extensions of the rubrails and to a floor sheet extending across the body between the inward horizontal extensions of the rubrails whereby to strengthen the body increase its acceptable length, height and load carrying capacity without a significant increase in weight and at little increase in cost.

6 Claims, 1 Drawing Sheet

BODY FOR END DUMP TRAILER

FIELD OF THE INVENTION

The present invention relates to semi-end dump trailer bodies, including frameless, frametype and quarter frame trailers, and more particularly to a body construction permitting an increase in the strength of the body without a significant weight increase whereby the length, height and load carrying capacity of the trailer can be increased relative to current body construction.

BACKGROUND OF THE INVENTION

There are numerous different designs for end dump trailers which with only minor modifications have been used for many years.

The conventional rubrails and floor crossmember design in common usage is illustrated in FIG. 1 hereof designated as Prior Art. The crossmembers are hollow, U-shaped members spaced appropriately under and welded to the floor of the bed, as illustrated in FIG. 2, also indicated as Prior Art.

The prior art constructions illustrated in FIGS. 1 and 2 conventionally supports a body about 39 feet long and 60 inches tall.

There are numerous patents on variations in the basic design described above but none that materially increase the strength of the prior art dump trailer bodies of current conventional design at a reasonable cost and reasonable increase in weight.

OBJECTS OF THE PRESENT INVENTION

It is an object of the present invention to alter the design of the rubrails and the crossmembers of a dump trailer body to permit an increase in strength of the body at relatively little increase in cost and no significant increase in weight.

It is another object of the present invention to change the floor and rubrail design of a dump body trailer to reduce the flexure of the sidewalls of the trailer and thus reduce weld failures.

Still another object of the present invention is to redesign the floor of a dump trailer body to assume part of the load formerly carried by the rubrails.

Yet another object of the present invention is to permit an increase in the length of a standard 39 foot, 60 inch tall dump trailer body to 48 feet and 102 inch tall body without a major redesign of the overall construction.

It is another object of the present invention to change the design of the crossmembers under the floor sheet to increase the moment of inertia and critical section modulus of the floor of a dump trailer body.

BRIEF DESCRIPTION OF THE PRESENT INVENTION

In accordance with the present invention the rubrails of an end dump trailer body are hollow rectangular rather than side open C-shaped members, the cross members are U-shaped with outwardly diverging legs and extend into contact with and have each leg and the base welded along the entire perimeter where they contact the rubrails. Both the rubrail and the crossmembers are deeper than in the prior art.

These four basic changes in the body construction are accomplished at relatively little or no increase in weight but provide a great increase in strength.

The construction set forth herein is applicable to van-type trailers also, increasing the strength of the body thereof.

The above and other features, objects and advantages of the present invention, together with the best means contemplated by the inventor thereof for carrying out the invention will become more apparent from reading the following description of a preferred embodiment and perusing the associated drawings in which:

DETAILED DESCRIPTION OF THE PRESENT INVENTION

Figure 1:
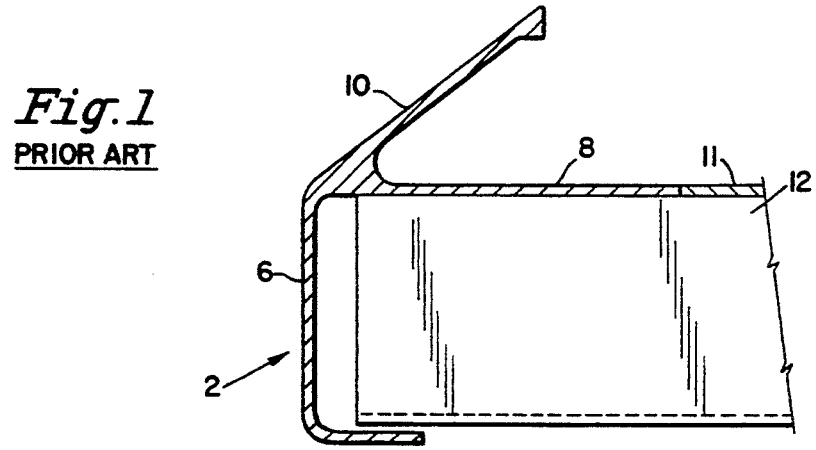
FIG. 1 is a cross-sectional view of a rubrail design of the prior art illustrating the mode of attachment of the crossmembers thereto.

Referring initially to FIG. 1 of the accompanying drawings, a rubrail 2 of prior art design constituted a side open generally C-shaped member having a bottom leg 4, a vertical leg 6 and an extended top leg 8 which can be integral with the rubrail extrusion as shown or as a separate welded on component and is adapted to extend into contact with and be welded to the bed or floor of the end dump trailer body. A member 10, extends upwardly and inwardly providing support for the side of the body, not illustrated.

Figure 2:
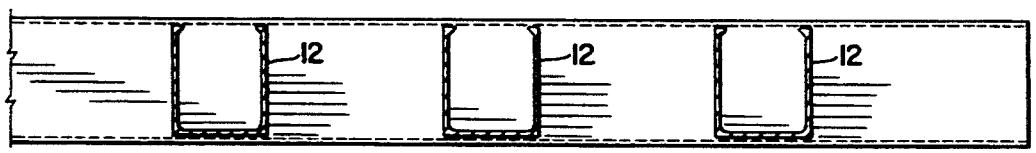
FIG. 2 is a cross-sectional view of the crossmembers of the prior art.

A crossmember 12 extends under the floor sheet 11 from one side of the trailer to the other and is welded to the underside of the member 8 and floor sheet 11. The crossmember 12 as seen in FIG. 2 of the accompanying drawings is a squared U-shaped member with each leg welded, as indicated above, only to the underside of the member 8 of the rubrail 2, and the floor sheet 11.

Figure 3:
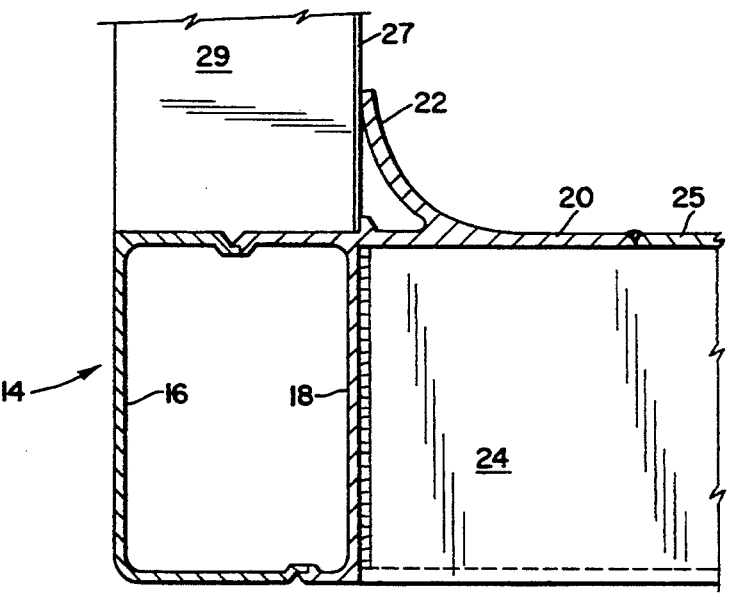
FIG. 3 is a cross-sectional view of the rubrail of the present invention illustrating the mode of attachment of the cross-members thereto.
Figure 4:
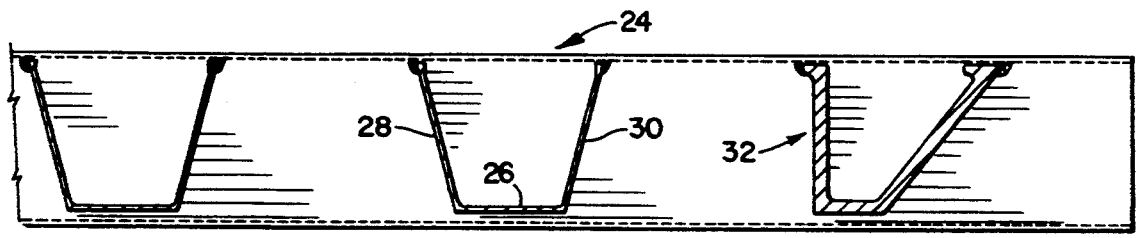
FIG. 4 is a cross-sectional view of the crossmembers employed in the present invention.

Referring now specifically to FIGS. 3 and 4 of the accompanying drawings, a rubrail generally designated by reference numeral 14 is a hollow tube formed by welding together two interlocking C-shaped members 16 and 18 or may be a single rectangular extrusion. The U-shaped member 18 has a member 20 extending therefrom for a short distance over top of a crossmember 24. A floor sheet 25 is located on the top of the crossmember 24, abuts and is welded to the member 20 of the rubrail. The floor sheet 25 extends to the other side of the body where it abuts a member corresponding to member 20 of FIG. 3. The floor sheet is welded to the crossmember 24 and the member 20.

An upwardly curved member 22 which can be a part of the rubrail extrusion or welded thereon contacts a sidewall 27 of the dump trailer body to which it is welded throughout the length of the body. Stakes 29 are welded to the top of the rubrail and to the sidewall 27 at normal intervals along the side of the body.

The crossmembers 24, illustrated in greater detail in FIG. 4, extend under the member 20 and the floor sheet 25 and are welded thereto. In addition and most importantly the crossmembers have their ends at the same angle to the vertical (in this case vertical), and abut against the member 18 to which they are welded along all areas of contact. This construction reduces flexure of all of the elements in contact with one another.

Referring to FIG. 4 of the accompanying drawings, there are illustrated the crossmembers 24. The crossmembers have a base 26 and outwardly flared sides 28 and 30, respectively. Thus the regions of support provided by these cross-members is increased relative to the squared U-shaped crossmembers of the prior art. A crossmember 32 of greater thickness in all its members is of conventional design and is normally disposed in the region of the hydraulic lift for the dump body whereby to provide the additional strength required in this region.

In consequence of the above arrangement of crossmembers and their welding to the rectangular rubrail, members 24 may be spaced, for instance, 14 inches on center as opposed to 10 in a typical prior art dump trailer. The overall structure is such that the body strength is greatly enhanced with no significant increase in weight and at little increase in cost.

As a result of the changes set forth herein the floor strength of the trailer otherwise conventional in all respects, is increased approximately 1.9 times. Further, calculations on the structure of the present invention to compare strength with the prior industry standard trailer show the following:

| Estimated Properties & Performance | Old Industry Stnd 4" U Crossmember | New SST Crossmember | Ratio New/Old |
| --- | --- | --- | --- |
| Moment of Inertia | 12.07 in.$^4$ | 29.89 in.$^4$ | 2.48 |
| Critical Section Modulus | 3.94 | 7.51 | 1.91 |
| Deflection with 150 lb/ft uniform load | .11 in. | .05 in. | .45 |
| Critical Stress for 40 lb object dropped from 10 ft | 41.5 KSI | 33.9 KSI | .82 |

NOTE: Constants used: Modulus of elasticity for aluminum = 1,100,000; Tensile yield stress for aluminum - 35,000 KSI.

Note that the critical stress of 41.5 KSI in the old construction produced by a dropped object exceeds the tensile yield stress for aluminum while that of the new structure is not exceeded. The moment of inertia is a measure of stiffness of a member, the crossmember in this case. The critical section modulus is used to calculate the maximum bending stress in a member.

In a specific design employing crossmembers 5.5 inches deep with 7 inches across at the floor sheet contact and 4 inches at the bottom of the U-shape, the moment of inertia has been increased by 2.48 times over the conventional 4 inch deep "U" or "I" design. Several empirical tests produced the following results: deflection under a 1138 pound lead on a 90 inch span was only 0.383 times that of the conventional trailer. In an actual test a 6600 lb. forklift was driven up and back on the floor of a conventional style trailer and a trailer of the invention. Both trailers had a ¼ inch thick floor sheet. Under the conventional unit the crossmembers deflected to an extent that was quite noticeable. With the trailer of the present invention no deflection was apparent.

Once given the above disclosure, many other features, modifications and improvements will become apparent to the skilled artisan. Such features, modifications and improvements are, therefore, considered to be a part of this invention, the scope of which is to be determined by the following claims.

What is claimed is:

1. An end dump trailer body comprising
    a pair of substantially rectangular hollow rubrails each extending along a different side of the body;
    each rubrail has a relatively short horizontal member having top and bottom surfaces and extending inward from the rubrail toward the rubrail toward other side of the body said rubrails also have an inner, generally vertical surface facing the rubrail along the other side of the body,
    a plurality of generally U-shaped crossmembers having opposite sides at an angle to the vertical substantially complementary to the inner vertical surfaces of the rubrails,
    the ends of said crossmembers contacting and welded to the inner vertical surfaces of the rubrails at spaced intervals along said body,
    each said relatively short horizontal member extending over top of and secured to the top surface of said crossmembers,
    said trailer having sidewalls along each side thereof,
    each said short horizontal member having a curved integral upward extension extending away from the rubrail on the other side of the trailer body and adapted to contact and be secured to a sidewall of said body.

2. An end dump trailer body according to claim 1 further comprising
    a floor sheet disposed over said crossmembers abutting ends of said short horizontal members,
    said floor sheet welded to the crossmembers and said short horizontal members.

3. An end dump trailer body according to claim 1 wherein
    each said rubrail is substantially rectangular and comprises a pair of mated square C-shaped members which when welded at the longitudinal juncture recesses to one another form a closed body.

4. An end dump trailer body comprising
    a pair of generally rectangular rubrails each extending along opposite sides of the trailer body and having an interior generally vertical wall,
    a floor plate,
    a plurality of generally U-shaped crossmembers lying under, in contact with and secured to said floor plate,
    each rubrail having a horizontal extension lying over top of said crossmembers and extending toward the rubrail on the opposite side of the body,
    the ends of the crossmembers extending under said horizontal extension into contact with and secured to said vertical wall of said rubrail and to said horizontal extensions,
    said horizontal extension extending into contact with and secured to said floor plate,
    said crossmembers and said rubrail being of approximately the same height,
    a pair of generally vertical sidewalls of said body comprised of sidewall sheet and stakes extending generally along the length of the body,
    a curved upward extension from each said horizontal extension extending away from the rubrail on the opposite side of the body into contact with and secured to a sidewall of said body.

5. An end dump trailer body according to claim 4 wherein said curved upward extension rises from the horizontal extension at a location between said interior generally vertical wall of the rubrail and the floor plate.

6. An end dump trailer body according to claim 4 wherein the inner vertical surface of the rubrail is aligned vertically substantially in the same plane with the sidewall sheet.

* * * * *